(12) United States Patent
Awalt et al.

(10) Patent No.: US 8,495,068 B1
(45) Date of Patent: Jul. 23, 2013

(54) DYNAMIC CLASSIFIER FOR TAX AND TARIFF CALCULATIONS

(75) Inventors: Kimberly Reuter Awalt, Bainbridge Island, WA (US); Venkatram Pramod, Auburn, WA (US); Christian Peter Bongiorno, Issaquah, WA (US); Peggy Pui-ki Cheung, Issaquah, WA (US); Somana P. Konganda, Seattle, WA (US); Chin Man Lai, Issaquah, WA (US); Marcella H. Nieswandt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 455 days.

(21) Appl. No.: 12/603,343

(22) Filed: Oct. 21, 2009

(51) Int. Cl.
*G06F 7/00* (2006.01)
*G06F 17/30* (2006.01)

(52) U.S. Cl.
USPC .......................................................... 707/740

(58) Field of Classification Search
USPC .......................................................... 707/740
See application file for complete search history.

(56) References Cited

U.S. PATENT DOCUMENTS

| | | | |
|---|---|---|---|
| 6,460,020 | B1 | 10/2002 | Pool et al. |
| 6,845,364 | B1 | 1/2005 | Pool et al. |
| 7,424,435 | B1 | 9/2008 | Yamagami et al. |
| 7,958,137 | B2 | 6/2011 | Vanderzweep et al. |
| 8,032,425 | B2 | 10/2011 | Yi |
| 2002/0046191 | A1 | 4/2002 | Joao |
| 2002/0091574 | A1 | 7/2002 | Lefebvre et al. |
| 2002/0103724 | A1 | 8/2002 | Huxter |
| 2002/0116318 | A1 | 8/2002 | Thomas et al. |
| 2002/0184111 | A1 | 12/2002 | Swanson |
| 2003/0014318 | A1 | 1/2003 | De La Motte et al. |
| 2003/0050815 | A1 | 3/2003 | Seigel et al. |
| 2004/0002898 | A1 | 1/2004 | Kuhlmann et al. |
| 2004/0254799 | A1 | 12/2004 | Zebooker |
| 2005/0060643 | A1* | 3/2005 | Glass et al. ................. 715/501.1 |
| 2005/0261932 | A1 | 11/2005 | Bottorff |
| 2005/0261995 | A1 | 11/2005 | Phelan |

(Continued)

FOREIGN PATENT DOCUMENTS

| | | |
|---|---|---|
| WO | WO 01/24096 A1 | 4/2001 |
| WO | WO 02/10949 A2 | 2/2002 |
| WO | WO 02/061537 A2 | 8/2002 |

OTHER PUBLICATIONS

Borderlinx, "How It Works," available at https://www.borderlinx.com/m/pages/eu/how-it-works, available as early as Feb. 17, 2010.

(Continued)

*Primary Examiner* — Hosain Alam
*Assistant Examiner* — Van Oberly
(74) *Attorney, Agent, or Firm* — Knobbe, Martens, Olson & Bear LLP (57) ABSTRACT

Systems and methods are provided for classifying a new item for purposes of estimating import fees associated with shipping the item internationally. In some embodiments, the classification is determined by calculating a similarity score for each of a plurality of previously classified items, each similarity score representing the similarity between a given previously classified item and the new item, identifying a similar item match for the new item, the similar item match corresponding to the previously classified item having the highest similarity score among the plurality of previously classified items, and assigning an item classification code associated with the similar item match to the new item.

23 Claims, 3 Drawing Sheets

U.S. PATENT DOCUMENTS

| | | |
|---|---|---|
| 2006/0036504 A1* | 2/2006 | Allocca et al. ................ 705/26 |
| 2007/0055580 A1 | 3/2007 | Woodward et al. |
| 2007/0226084 A1 | 9/2007 | Cowles |
| 2007/0299733 A1 | 12/2007 | Derby et al. |
| 2008/0097933 A1 | 4/2008 | Awaida et al. |
| 2008/0270149 A1 | 10/2008 | Cirulli et al. |
| 2008/0300907 A1 | 12/2008 | Musier et al. |
| 2009/0271282 A1 | 10/2009 | Pool et al. |
| 2010/0036714 A1 | 2/2010 | Chow |

OTHER PUBLICATIONS

Internet Archive Wayback Machine archive of http://www.spectrapure.com/international.htm, going back to Mar. 18, 2009; http://web.archive.org/web/20090318000538/http://www.spectrapure.com/international.htm.

Overstock.com, International Shipping, available at http://www.overstock.com/intlcountryselect, available as early as Mar. 11, 2010.

* cited by examiner

DYNAMIC CLASSIFIER FOR TAX AND TARIFF CALCULATIONS

BACKGROUND

Merchants often allow customers to order products to be shipped internationally. After a merchant ships a product internationally to a customer, certain import fees, such as duty and tariff charges, are usually assessed when the product enters the destination country. At the time the international customer purchases the product, he typically does not know the total cost of the import fees that will be assessed prior to delivery. This causes uncertainty in the total cost of the order at the time the customer places the order.

A tariff schedule typically exists for a given destination country and such a schedule is often consulted by authorities in the destination country in order to assess fees upon import. The tariff schedule for a given country may contain 17,000 or more unique classification codes based on a product's name, use, materials used in construction, etc. Due to overlapping and sometimes contradictory rules for classifying an item, two qualified personnel could arrive at different classifications for the same product shipped to the same destination country. Thus, if a merchant aims to estimate import fees at the time a customer orders a product, the merchant would typically need to have previously determined a classification code for the product and the given destination country. Such classification would typically be accomplished by manually consulting a large multi-volume document and interpreting complicated rules. Such manual classification is time consuming and may result in inconsistent or inaccurate classifications.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to classifying a new, previously unclassified item for purposes of estimating import fees associated with shipping the item internationally. In certain embodiments, the classification is determined by calculating a similarity score for each of a plurality of previously classified items, each similarity score representing the similarity between a given previously classified item and the new item; identifying a closest item match for the new item, the closest item match corresponding to the previously classified item having the highest similarity score among a plurality of previously classified items; and assigning an item classification code associated with the closest item match to the new item. For example, a plurality of items, such as products that a merchant determines are eligible to be shipped to international destinations, may have been previously classified by the merchant or a third party vendor by assigning one or more classification codes to each item. One type of classification code, for example, may be a Harmonized Tariff Schedule ("HTS") code. HTS codes are based on the international Harmonized Commodity Description and Coding System ("HS"), administered by the World Customs Organization. Most countries base their tariff schedules on the HS. The United States International Trade Commission maintains and publishes the HTS, and the Schedule is interpreted and enforced by the Bureau of Customs and Border protection. Other countries have similar agencies that interpret and enforce such schedules unique to their countries. Typically, if a vendor or merchant desires to assign a classification code, such as an HTS code, to a given item, the vendor or merchant must interpret complicated tariff schedules for a given country. Aspects of the present disclosure provide systems and methods that may be used to automatically assign a classification code to a previously unclassified item by comparing the item to previously classified items, rather than by consulting and interpreting tariff schedules.

In some embodiments, the dynamic classifier may access a data store that stores data associated with a plurality of previously classified items, such previously classified items including items that have been manually classified by consulting documents detailing a given destination country's tariff schedules. The dynamic classifier described herein, rather than manual classification, may then be used to classify a new item by identifying the previously classified item that is most similar to the new item and assigning a classification code associated with most similar item to the new item. The dynamic classifier may use a variety of methods to calculate a similarity score representing the similarity between each previously classified item and the new item to be classified, discussed further below. In some embodiments, calculating a similarity score corresponding to a given previously classified item includes comparing item attributes and item attribute values associated with the given previously classified item with item attributes and item attribute values associated with the new item. Once the dynamic classifier has calculated a similarity score relative to the new item for each previously classified item, which may be all or a subset of the previously classified items for which classifications have been previously assigned, the dynamic classifier may identify the closest item match by identifying the previously classified item with the highest calculated similarity score. The dynamic classifier may then assign a classification code associated with the closest item match to the new item. In some embodiments, this classification code may be a classification code associated with a single reference country, such as an HTS code for the United States. Classification codes associated with other destination countries may then be determined by mapping the reference country's classification code to one or more other countries' classification codes, as discussed further below. In other embodiments, the dynamic classifier may assign multiple classification codes associated with the closest item match to the new item.

Figure 1:
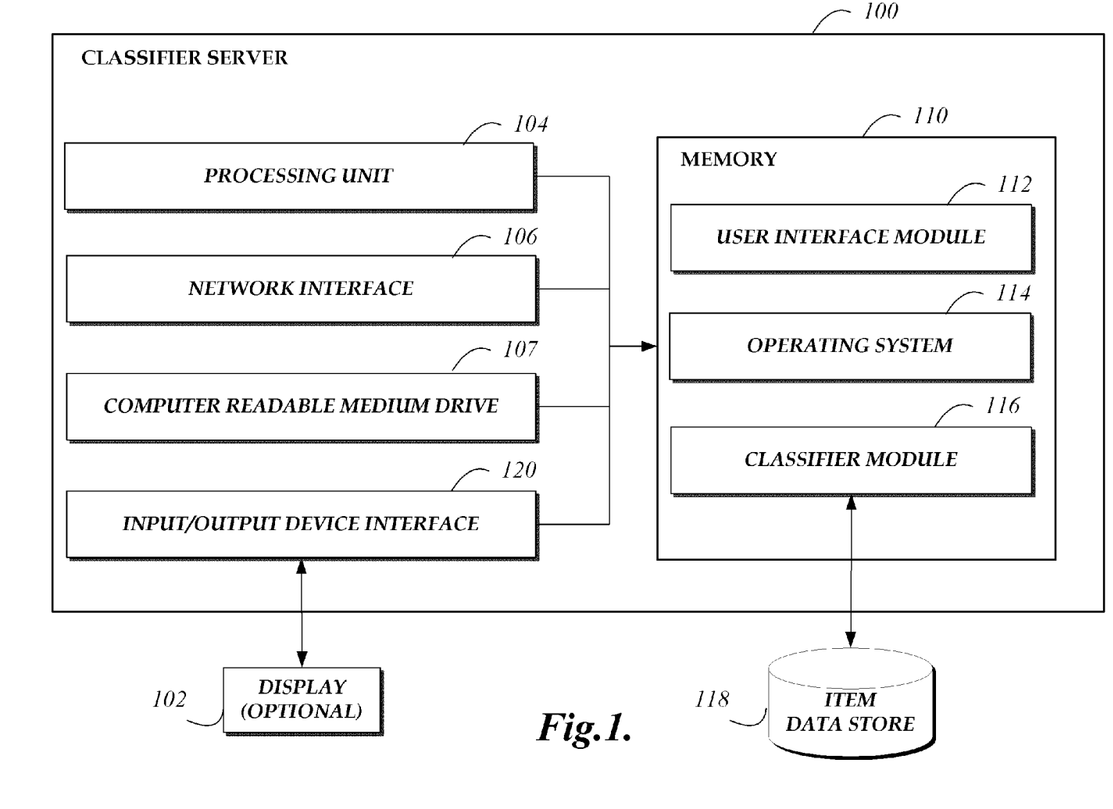
FIG. 1 depicts a general architecture of a classifier server for carrying out aspects of a dynamic classifier for tax and tariff calculations.

FIG. 1 depicts a general architecture of a classifier server 100 for carrying out aspects of the dynamic classifier. While the dynamic classifier is depicted in FIG. 1 as implemented by a single computing device (i.e., classifier server 100), this is illustrative only. In an actual embodiment, the dynamic classifier may be embodied in a plurality of classifier servers 100, each executing an instance of the dynamic classifier. In another embodiment, the classifier server 100 may be implemented in distributed and/or networked computing systems.

The general architecture of the classifier server 100 depicted in FIG. 1 includes an arrangement of computer hardware and software components that may be used to implement the dynamic classifier. Those skilled in the art will appreciate that the classifier server 100 may include many more (or fewer) components than those shown in FIG. 1. It is not necessary, however, that all of these generally conventional components be shown in order to provide an enabling disclosure. As illustrated in FIG. 1, the classifier server 100 includes a network interface 106, a processing unit 104, an input/output device interface 120, an optional display 102, and a computer readable medium drive 107, all of which may communicate with one another by way of a communication bus. The network interface 106 may provide connectivity to one or more networks or computing systems. The processing unit 104 may thus receive information and instructions from other computing systems or services via a network. The processing unit 104 may also communicate to and from memory 110 and further provide output information for an optional display 102 via the input/output device interface 120. Though not shown, the input/output device interface may also accept input from a device such as a keyboard, mouse, digital pen, etc.

The memory 110 contains computer program instructions that the processing unit 104 executes in order to operate the dynamic classifier. The memory 110 generally includes RAM, ROM and/or other persistent memory. The memory 110 may store an operating system 114 that provides computer program instructions for use by the processing unit 104 in the general administration and operation of the classifier server 100. The memory 110 may further include computer program instructions and other information for implementing features of the dynamic classifier. For example, in one embodiment, the memory 110 includes a user interface module 112 that generates user interfaces (and/or instructions therefor) such as that depicted in FIG. 3 for display upon a client computing device, e.g., via a navigation interface such as a web browser installed on the client computer device. In addition, memory 110 may include or communicate with an auxiliary item data store 118. Item data stored in item data store 118 may include any information related to an item, such as an item available for purchase, that may be of interest to a consumer or may be useful for classifying the item or determining similarity to other items. For example, item data may include, but is not limited to, price, availability, title, item identifier, item feedback (e.g., user reviews, ratings, etc.), item image, item description, item attributes, item attribute values, etc. As discussed further below, item attributes stored for a given item may depend on the type of item or a category associated with the item.

In addition to the user interface module 112, the memory 110 may include a classifier module 116 that may be executed by the processing unit 104. In one embodiment, the classifier module 116 provides the functionality of the dynamic classifier, e.g., the functionality of calculating similarity scores, determining a closest item match, assigning a classification code to an item, etc.

Figure 2:
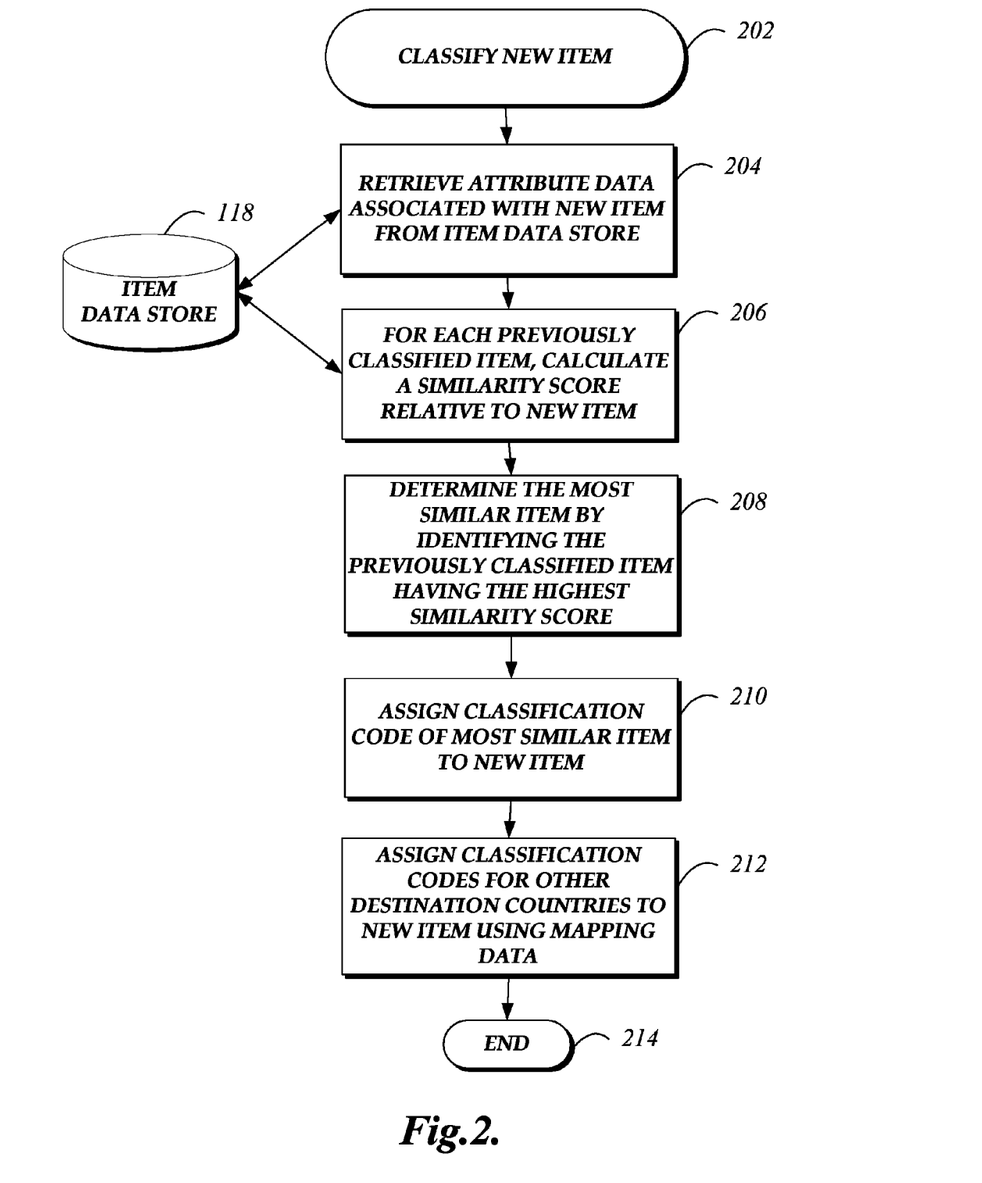
FIG. 2 is a flow diagram of an illustrative method implemented by the dynamic classifier to classify a new item for purposes of making a more accurate calculation of taxes and tariffs due upon delivery of the new item at a foreign destination.

FIG. 2 is a flow diagram of an illustrative method implemented by the dynamic classifier to classify a new item. In certain embodiments, the new item is an item that has not been previously assigned a classification for import fee estimation purposes. In yet other embodiments, a "new" item is an item that, for some reason, is being re-classified. The method begins at block 202 and then proceeds to block 204, in which the dynamic classifier retrieves attribute data associated with the new item to be classified from item data store 118. In certain embodiments, item data store 118 may store information associated with a plurality of items that are eligible to be shipped to customers internationally. In certain embodiments, the stored information about each item may include a unique identifier for the item, item attributes and associated item attribute values associated with the item, and one or more classification codes associated with the item, such as an HTS code. In the illustrated embodiment, item data store 118 includes item attributes and associated item attribute values for both previously classified and new, unclassified items, such as the new item to be classified in the illustrative method shown in FIG. 2. In certain embodiments, the information regarding the new item stored in item data store 118 may include a unique identifier for the item, attributes, and attribute values, but not yet include a classification code for import fee calculation purposes, such as an HTS code, prior to the dynamic classifier assigning a classification code to the new item at block 210, discussed below.

The attribute data associated with the new item that is retrieved from item data store 118 at block 204 may include both item attributes and item attribute values. The item attributes stored for a given item may depend on the type of item or a category associated with the item. Example item attributes for a given item, such as a running shoe, may include "Title," "Item Type Keywords," "Style Keywords," "Fabric Type," "Brand Name," "Sole Type," etc. An item attribute value is a value associated with a given item attribute. For example, the "Fabric Type" item attribute for a given item, such as running shoes, may have an associated item attribute value of "leather." For a given item attribute, an item may have more than one associated item attribute value. For example, the running shoes item may have multiple item attribute values associated with the item attribute "Style Keywords." In some embodiments, the item data store 118 may store the same set of attributes for all items, or for all items in a given item category, but for a given item may only store associated item attribute values for a subset of the item attributes. For example, an item attribute of "Sole Type" may be stored for both a running shoes item and a wristwatch item, but there may be no associated item attribute value stored for the wristwatch item, because, for example, the "Sole Type" attribute is not relevant to a wristwatch. In other embodiments, an item attribute for a given item may only be stored in the item data store 118 if an associated item attribute value is also stored.

At block 206, for each previously classified item, the dynamic classifier calculates a similarity score relative to the new item. In some embodiments, the previously classified items for which a similarity score is calculated comprise a subset of the previously classified items in the item data store, e.g., items in a given item category associated with the new item, such as electronics. In other embodiments, similarity scores may be calculated for all previously classified items. The similarity score for a given previously classified item is intended to represent the amount of similarity, or relative level or degree of similarity, between the given previously classified item and the new item. In certain embodiments, the similarity score is calculated based at least in part on the attribute and attribute value information associated with both the new item and each previously classified item stored in item data store 118. In certain embodiments, the similarity score may be calculated based in part on other data, such as an image of the previously classified item and/or the new item, either stored in the item data store 118 or retrieved or received from other sources. For example, if an image of the previously classified item showed a shirt with text on the front, and an image of the new item showed a shirt with the same text in a different font, that image similarity may be factored into the similarity score. While certain methods for determining similarity and calculating a similarity score are described below, those skilled in the art will appreciate that a variety of methods for determining similarity may be used to calculate a similarity score.

Methods for calculating a similarity score for a given previously classified item will now be described. As discussed above, at block 206 the dynamic classifier performs similarity calculations for each of the previously classified items, or for a subset of the previously classified items. In certain embodiments, the dynamic classifier begins the process of calculating a similarity score for a given previously classified item by retrieving attribute data associated with the given previously classified item from item data store 118. As discussed above, attribute data associated with the given previously classified item may comprise both item attributes and associated item attribute values. In certain embodiments, the dynamic classifier may consider both the similarity of item attributes and the similarity of item attribute values between the given previously classified item and the new item. An attribute similarity score may be calculated based on the similarity of the item attributes, and a separate attribute value similarity score may be calculated based on the item attribute values. A final similarity score may be calculated based on both the attribute similarity score and the attribute value similarity score, for example by calculating a weighted average of the two scores. In other embodiments, the dynamic classifier may not calculate separate scores for item attribute similarity and item attribute value similarity, but instead calculate a single similarity score for a given previously classified item by treating each item attribute and its associated item attribute value as an attribute/value pair for similarity calculation purposes, discussed further below.

In some embodiments, the attribute similarity score may be calculated by determining the number of attributes that the previously classified item has in common with the new item. For example, if the previously classified item and the new item each have a "Sole Type" attribute stored in the item data store 118, "Sole Type" may be considered an attribute that the two items have in common. A first previously classified item that has ten attributes in common with the new item may be considered as having a higher likelihood of being similar to the new item than a second previously classified item that only has one attribute in common with the new item. In such a situation, the calculated attribute similarity score may be higher for the first previously classified item than for the second. In other embodiments, the attribute similarity score calculation may consider the relative importance of item attributes and assign greater weight to the similarity of certain item attributes than other item attributes. For example, while a "Color" attribute may be stored for a large subset of the previously classified items, a "Band Type" attribute may be stored for a much smaller subset. For example, in certain embodiments, a "Band Type" attribute may only be stored for an item if the item is a wristwatch. In such embodiments, the fact that two items both have an item attribute value assigned for the "Band Type" attribute may be much more relevant to determining similarity of the two items than the fact that the two items both have an item attribute value assigned for the "Color" attribute.

Rule sets may also be defined for assigning weights to various attributes in the attribute similarity score calculation. The rule set may depend on a category associated with the new item and/or the previously classified item, such as a different rule set for shoes, electronics, etc. In other embodiments, a similarity calculation method may be used that inherently assigns greater weight to less common attributes, or to attributes that are more appropriate for grouping items together, without relying on an explicitly defined rule set.

In some embodiments, an attribute value similarity score may be calculated based on the item attribute values corresponding to the attributes that the previously classified item and the new item have in common. For each item attribute that the previously classified item has in common with the new item, the dynamic classifier may determine the level of similarity between the corresponding item attribute value(s) of the previously classified item and item attribute value(s) of the new item. For example, if the previously classified item and the new item both have a "leather" item attribute value associated with a "Band Type" attribute, this similarity may raise the attribute value similarity score for the given previously classified item. In some embodiments, the attribute value similarity score may weight the similarity of item attribute values associated with certain item attributes higher than other item attributes, similar to the weighting discussed above in relation to attribute similarity score calculation. Alternatively, the attribute value similarity score may consider two item attribute values similar even when there are some differences in the stored item attribute values. For example, if the item attribute value of the "Band Type" attribute for the previously classified item is "leather," and the item attribute value of the "Band Type" attribute for the new item is "leater" (note that the 'h' character is missing), the dynamic classifier may consider these item attribute values similar despite the misspelling. In certain embodiments, two item attribute values may be considered similar despite differences in casing, transposed letters, minor language variations (such as in American English or British English), etc. In contrast, if the item attribute value of the "Band Type" attribute for the previously classified item is "leather," and the item attribute value of the "Band Type" attribute for the new item is "metal," these item attribute values would be considered dissimilar, and in certain embodiments would not increase the attribute value similarity score for the given previously classified item.

As mentioned above, in certain embodiments the similarity score for a given previously classified item may be calculated by treating each item attribute and its associated item attribute value as an attribute/value pair for similarity calculation purposes. This calculation may be accomplished in part using document comparison or document search methods. For example, in broad terms, the calculation may be conducted by transposing each item to a document and the attributes of that item to the terms of said document, and then using a general purpose similarity or search tool, such as the Lucene open source search engine, to determine the similarity between these documents. In order to facilitate the use of a general purpose similarity or search tool, all previously classified items may be preprocessed to create an index or repository that may be consulted or queried to determine the previously classified item most similar to a given new item. The preprocessing or preparation of the index may be accomplished by retrieving the attribute information for each previously classified item from item data store 118 and creating a document for each item, where the contents of a given item's document comprise the attribute/value pairs retrieved from the item data store 118 for the given item. An example attribute/value pair may be "Fabric Type: leather," or "Sole Type: rubber," and the document for a given item may contain all of the attribute/value pairs stored in the item data store 118 for the given item. In certain embodiments, once such a document has been created for each previously classified item, known tools may be used to analyze each document and create a repository or index.

The repository or index may relate each attribute/value pair to each document and indicate how strongly each attribute/value pair exists in each document, as represented by a score. For example, the resulting repository may contain each attribute/value pair that has been defined for any previously classified item as a "term," and a plurality of (Document, Weight) pairs corresponding to each attribute/value pair (or term), where the Document value is a unique identifier of the document associated with a given previously classified item, and the Weight value refers to how strongly the given attribute/value pair (or term) exists in that Document. For example, an abstract representation of a term stored in the repository may be "FabricType:leather," and this term may be associated in the repository with two (Document, Weight) pairs that may be abstractly represented as "(B00001OPIY, 8)" and "(B00001RMD,5)," where "B00001RMD" is a unique identifier for a document corresponding to a certain previously classified item, and "5" is a weight representing how strongly the FabricType:leather term relates to the document identified as "B00001RMD." Thus, in this example, the "Fabric Type: leather" attribute/value pair would be more strongly associated with the previously classified item that had its attributes represented in document B00001OPIY than with the previously classified item that had its attributes represented in document B00001RMD, based on the weight of "8" being greater than the weight of "5."

In embodiments in which document similarity tools are used to calculate item similarity, once the repository has been created, calculating similarity scores for the new item at block 206 of FIG. 2 involves creating a query that includes the attribute/value pairs associated with the new item, as retrieved from the item data store 118. The repository, discussed above, may then be queried using any of a variety of prior art search tools to receive a ranking or scored set of "documents" represented in the repository, each document corresponding to a previously classified item, as discussed above. Thus, in certain embodiments, the output of the search or comparison query may be used to determine which previously classified item is the best match, or has the highest similarity score, to the new item.

At block 208 of FIG. 2, the dynamic classifier determines the most similar item by identifying the previously classified item having the highest similarity score relative to the new item. As discussed above, many different similarity methods may be used to calculate a similarity score for each previously classified item, or to rank each previously classified item's similarity to the new item. At block 208, regardless of the similarity method used in block 206, the dynamic classifier determines the most similar item to be the previously classified item with the highest similarity score or similarity ranking, as calculated at block 206.

At block 210, the dynamic classifier assigns at least one classification code associated with the most similar item to the new item. In other words, in some embodiments, once the dynamic classifier has identified the most similar previously classified item, the dynamic classifier determines that the new item may be treated similarly to the most similar item for purposes of estimating import fees, and thus may be assigned a classification code associated with the most similar item. In some embodiments, this classification code may be one country's tariff schedule code which may then be used as a reference code to determine or map to other countries' classification codes. For example, the new item may be assigned the United States' HTS code that was assigned to the previously classified item in item data store 118. The United States' classification code may be chosen as the reference country code because it has the largest number of different classifications, and thus may be the most precise reference code for mapping to another country's code. In other embodiments, the dynamic classifier may assign different or multiple countries' classification codes associated with the most similar item to the new item.

At block 212, the dynamic classifier assigns classification codes for other destination countries to the new item using mapping data. For example, in some embodiments, the United States' HTS code, as a reference code, may be the only classification code assigned to the new item at block 210. In this case, at block 212, the dynamic classifier may consult a mapping table that maps each United States' HTS code to classification codes, such as tariff numbers, of other destination countries. The information in the mapping table may allow the dynamic classifier to estimate tax and duty information for importing an item to a given country using only the United States' HTS code as a reference. Estimation of tax and duty information may then be calculated for an order to ship the item to a particular destination country by retrieving the particular destination country's classification code for the given item from the mapping table and applying a corresponding formula or rate, such as may be listed in the mapping table or in a separate table that lists tariff and/or tax formulas for a country by classification code. In some embodiments, the mapping table may be used to assign classification codes for multiple countries to the item. In other embodiments, the mapping table may not be consulted to determine a given country's classification code until an actual order is placed for that item to be shipped to the given country, at which time a classification code for that country is determined from the mapping table using the United States' HTS code that is assigned by the dynamic classifier as a reference. In the illustrated embodiment, the method ends in block 214.

In certain embodiments, the determined tax and duty information is only used as an estimate at the time of shipment, as the actual import fees will not be determined until the shipment actually enters the destination country. Thus, in certain embodiments, the item similarity approach of the dynamic classifier as described herein aims to provide an accurate estimate of the classification code that may be used by foreign authorities to assess import fees associated with a shipment of the new item to a given country, rather than to be used for actual compliance purposes. Given the complexity of tariff schedules, this estimate may be both faster and more accurate than estimates based on manual classification.

In certain embodiments, a feedback or auditing step may occur after a new item has been classified by the dynamic classifier. For example, the difference between the classification code determined by the dynamic classifier and the classification code for the same item as determined by manually consulting tariff schedules may be analyzed to help determine the accuracy of the dynamic classifier for a given item or group of items. In some embodiments, the difference between import fees estimated using the classification code assigned to an item by the dynamic classifier and the actual import fees assessed when the item is delivered may be analyzed to determine the accuracy of the dynamic classifier for a given item or group of items. If such a feedback or auditing step results in a determination that the dynamic classifier has assigned accurate classification codes for a given item or group of items, the dynamic classifier may then be configured to automatically assign and map classification codes for previously unclassified items in a certain category or group for which the dynamic classifier has achieved accurate results. If such a feedback or auditing step results in a determination that the dynamic classifier is not assigning accurate classification codes for a given item or group of items, adjustments may be made to a rule set or attribute weight associated with a given category or group of items, a change may be made to the mapping table, and/or a change may be made to the index or repository.

Figure 3:
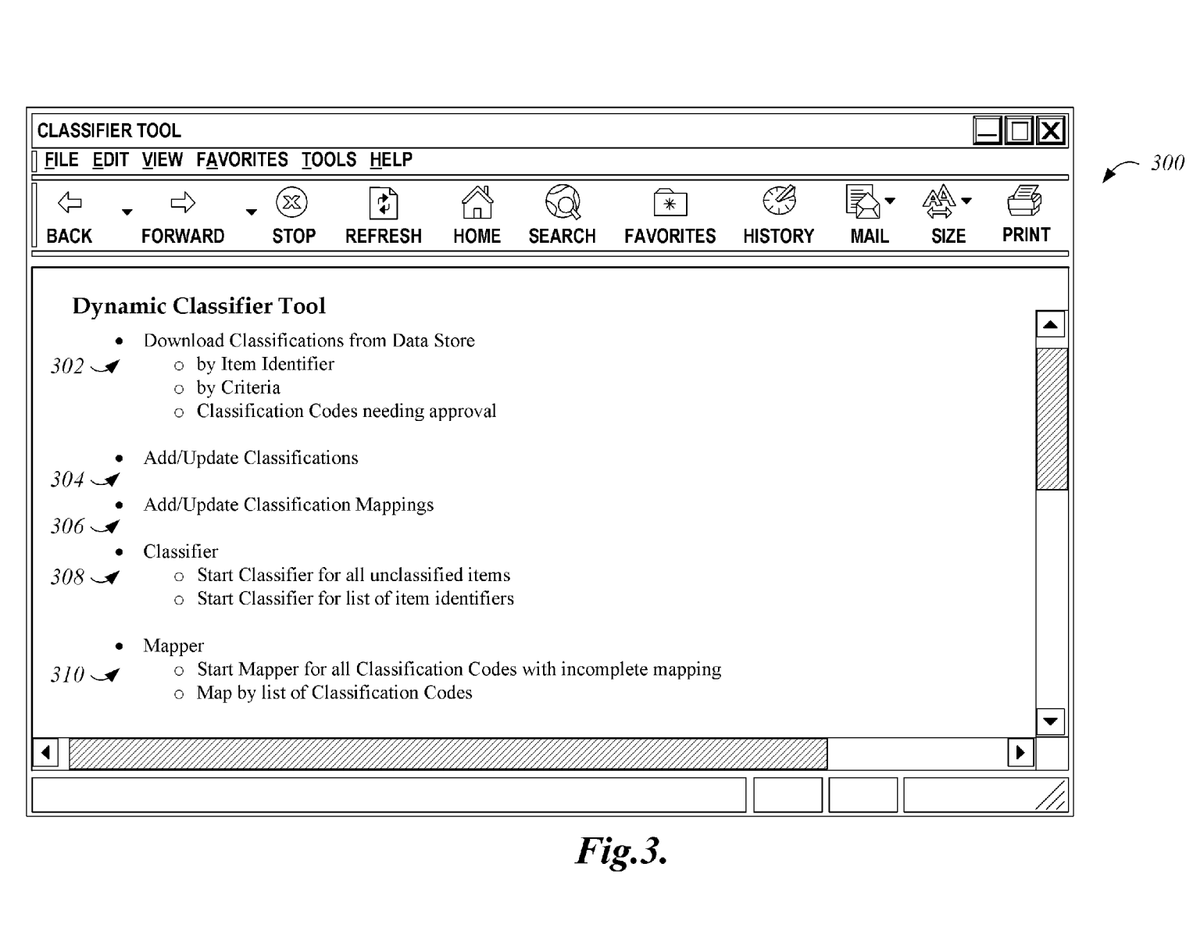
FIG. 3 is an illustrative user interface enabling a user to access features of the dynamic classifier for purposes such as starting classification for a new item or reviewing classifications that have been determined by the dynamic classifier.

FIG. 3 is an illustrative user interface 300 that may be generated by the user interface module 112 that allows a user, such as an individual responsible for determining when items should be classified by the dynamic classifier or an individual responsible for auditing results of the dynamic classifier, to access features of the dynamic classifier for purposes such as starting classification for a new item or reviewing classifications that have been determined by the dynamic classifier. As shown, the interface 300 is displayed via a browser operating on a computing device utilized by a user of the dynamic classifier tool. As shown, interface 300 includes text or buttons that the user may select to access features of the dynamic classifier tool. For example, in some embodiments, if the user selects text 302, "Download Classifications from Data Store," the user may access or download information regarding classification codes that have been assigned to a given item or plurality of items. For example, the user may enter a unique item identifier in order to view the classification codes assigned to the corresponding item. The user may instead enter criteria, such as an item category, in order to view classification codes assigned to a plurality of items associated with the given item category. In the illustrated embodiment, the user may select the text "Classification Codes needing approval" in order to review and approve any classifications that have been assigned by the dynamic classifier and require further approval. In certain embodiments, further approval may be needed, for instance, if certain newly classified items are associated with item categories that have not yet been approved for automatic classification through a feedback or auditing process.

If the user selects text 304, "Add/Update Classifications," the user may be able to manually add information regarding classification codes for the reference country, such as adding, deleting, or modifying United States' HTS codes. The user may also be able to modify rule sets, such as a rule set or attribute weight associated with a given item category. In certain embodiments, the user may select text 306, "Add/Update Classification Mappings," in order to make changes to the mapping table that is used to map the reference country's classification code, such as a United States' HTS code, to other countries' codes. Such changes may be made when a country makes changes to its tariff schedule, or when the dynamic classifier or a user determines that a certain code has been mapping incorrectly for a given country. The user may select text 308, "Classifier," to start the dynamic classifier for all unclassified items, or alternatively for specific items as listed by item identifier. In some embodiments, if the user selects to start the dynamic classifier, the dynamic classifier may later notify the user when the requested classification is complete, so that the user may conduct any required or optional approval. The user may select text 310, "Mapper," in order to instruct the dynamic classifier to consult the mapping table and map reference country classification codes to other countries' classification codes for items that currently have incomplete mapping.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for classifying a new item for purposes of estimating an import fee associated with the new item, the system comprising:
 a data store that stores information regarding a plurality of previously classified items, the information regarding each previously classified item comprising a classification code that may be used to estimate an import fee associated with each previously classified item; and
 a computing system comprising one or more computing devices, said computing system in communication with the data store and operative to:
  for each of a plurality of previously classified items, calculate an item similarity score representing a relative level of similarity between a given previously classified item and the new item, wherein the item similarity score for the given previously classified item is calculated at least partly by:
   determining an attribute similarity score for the given previously classified item, wherein the attribute similarity score is determined at least in part by determining a number of common attributes associated with the given previously classified item and the new item, wherein a common attribute comprises an attribute that is associated with the given previously classified item and is also associated with the new item; and determining an attribute value similarity score for the given previously classified item, wherein the attribute value similarity score is determined at least in part by determining a number of attribute values, of one or more of the common attributes, that are associated with an attribute of the given previously classified item and also associated with a corresponding attribute of the new item;

wherein the item similarity score is calculated based at least in part on both the determined attribute similarity score and the determined attribute value similarity score; and determine a closest item match for the new item, wherein the closest item match corresponds to a previously classified item having a highest degree of similarity to the new item among the plurality of previously classified items based on item similarity score;

assign an item classification code associated with the closest item match to the new item for purposes of estimating an import fee associated with the new item; and estimate an import fee associated with the new item based on the assigned item classification code.

2. The system of claim 1, wherein the import fee comprises at least one of an import duty and an import tax.

3. The system of claim 1, wherein the item classification code is a Harmonized Tariff Schedule code.

4. The system of claim 1, wherein calculating an attribute value similarity score for a given previously classified item further comprises assigning a greater weight to similarity of attribute values of certain attributes than other attributes.

5. The system of claim 4, wherein attributes that are assigned a greater weight are determined based at least in part on a product category associated with the given previously classified item.

6. A computer-implemented method for classifying a new item for purposes of estimating an import fee associated with the new item, the computer-implemented method comprising:

as implemented by one or more computing devices configured with specific executable instructions, for each of a plurality of previously classified items, calculating an item similarity score representing a degree of similarity between a given previously classified item and the new item, wherein the item similarity score for the given previously classified item is calculated at least in part by:

determining an attribute similarity score for the given previously classified item, wherein the attribute similarity score is determined at least in part by determining a number of common attributes associated with the given previously classified item and the new item, wherein a common attribute comprises an attribute that is associated with the given previously classified item and is also associated with the new item; and determining an attribute value similarity score for the given previously classified item, wherein the attribute value similarity score is determined at least in part by determining a number of attribute values, of one or more of the common attributes, that are associated with an attribute of the given previously classified item and also associated with a corresponding attribute of the new item;

wherein the item similarity score is calculated based at least in part on both the determined attribute similarity score and the determined attribute value similarity score;

determining a similar item match for the new item, wherein the similar item match corresponds to a previously classified item having a highest degree of similarity to the new item among the plurality of previously classified items based on item similarity score; and assigning an item classification code associated with the similar item match to the new item.

7. The computer-implemented method of claim 6, further comprising preprocessing attribute data associated with the plurality of previously classified items, wherein the attribute data comprises attributes and attribute values associated with each of the previously classified items.

8. The computer-implemented method of claim 6, wherein the item classification code comprises a classification that may be used to estimate import duty or import tax.

9. The computer-implemented method of claim 6, wherein calculating an item similarity score comprises determining a similarity between an image associated with a previously classified item and an image associated with the new item.

10. The computer-implemented method of claim 6, wherein the item classification code is a Harmonized Tariff Schedule code.

11. The computer-implemented method of claim 6, wherein calculating an item similarity score comprises applying a rule set.

12. The computer-implemented method of claim 11, wherein the rule set is associated with a product category of the new item or a product category of the given previously classified item.

13. The computer-implemented method of claim 6, further comprising using the assigned item classification code to estimate tax and duty information for shipping the new item to a given destination country.

14. The computer-implemented method of claim 6, further comprising mapping the item classification code to a second item classification code associated with a different country.

15. The computer-implemented method of claim 6, further comprising auditing the assigned item classification code for the new item to determine whether unclassified items in a product category associated with the new item should be automatically classified.

16. A non-transitory computer-readable medium having a computer-executable component for classifying a new item, the computer-executable component comprising:

a classification component for:

calculating an item similarity score for each of a plurality of previously classified items, wherein the item similarity score for a given previously classified item represents a relative level of similarity between the given previously classified item and the new item, wherein the item similarity score for the given previously classified item is calculated at least in part by:

determining an attribute similarity score for the given previously classified item, wherein the attribute similarity score is determined at least in part by determining a number of common attributes associated with both the given previously classified item and the new item; and determining an attribute value similarity score for the given previously classified item, wherein the attribute value similarity score is determined at least in part by determining a number of attribute values, of one or more of the common attributes, that are associated with an attribute of the given previously classified item and also associated with a corresponding attribute of the new item;

wherein the item similarity score is determined based at least in part on both the determined attribute similarity score and the determined attribute value similarity score; and determining a similar item match for the new item, wherein the similar item match corresponds to a previously classified item having a highest degree of similarity to the new item among the plurality of previously classified items based on item similarity score; and assigning a classification code associated with the similar item match to the new item.

17. The non-transitory computer-readable medium of claim 16, wherein the classification component is further configured to estimate an import fee associated with the new item based on the assigned classification code.

18. The non-transitory computer-readable medium of claim 16, wherein the classification component is further configured to preprocess attribute data associated with the plurality of previously classified items, wherein the attribute data comprises attributes and attribute values associated with each of the previously classified items.

19. The non-transitory computer-readable medium of claim 16, wherein the item classification code is a Harmonized Tariff Schedule code.

20. The non-transitory computer-readable medium of claim 16, wherein calculating an item similarity score comprises applying a rule set.

21. The non-transitory computer-readable medium of claim 20, wherein the rule set is associated with a product category of the new item or a product category of the given previously classified item.

22. The non-transitory computer-readable medium of claim 16, wherein the classification component is further configured to map the item classification code to a second item classification code associated with a different country.

23. The non-transitory computer-readable medium of claim 16, wherein the classification component is further configured to audit the assigned item classification code for the new item to determine whether unclassified items in a product category associated with the new item should be automatically classified.

* * * * *